(12) United States Patent
Lee

(10) Patent No.: US 8,928,630 B2
(45) Date of Patent: Jan. 6, 2015

(54) MOBILE DEVICE AND METHOD FOR PROCESSING AN ACOUSTIC SIGNAL

(75) Inventor: Ho-Sub Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 12/829,646

(22) Filed: Jul. 2, 2010

(65) Prior Publication Data

US 2011/0084940 A1   Apr. 14, 2011

(30) Foreign Application Priority Data

Oct. 9, 2009   (KR) .................. 10-2009-0095958

(51) Int. Cl.
  *G06F 3/043*   (2006.01)
  *G06F 3/0488*  (2013.01)
  *G06F 3/041*   (2006.01)

(52) U.S. Cl.
  CPC ............ *G06F 3/043* (2013.01); *G06F 3/04883* (2013.01); *G06F 3/0416* (2013.01)
  USPC ....................................... 345/177; 178/18.04

(58) Field of Classification Search
  CPC ...... G06F 3/043; G06F 3/0433; G06F 3/0436
  USPC ................ 345/156–184; 178/18.01–18.11, 178/19.01–19.07, 20.01–20.04
  See application file for complete search history.

(56) References Cited

U.S. PATENT DOCUMENTS

| | | | | |
|---|---|---|---|---|
| 4,654,648 A | * | 3/1987 | Herrington et al. | 345/179 |
| 5,070,325 A | * | 12/1991 | Tanaka et al. | 345/179 |
| 5,365,516 A | * | 11/1994 | Jandrell | 370/335 |
| 6,069,594 A | * | 5/2000 | Barnes et al. | 345/7 |
| 6,271,835 B1 | * | 8/2001 | Hoeksma | 345/168 |
| 2001/0020936 A1 | * | 9/2001 | Tsuji | 345/177 |
| 2001/0050671 A1 | * | 12/2001 | Ogawa et al. | 345/156 |
| 2002/0075240 A1 | * | 6/2002 | Lieberman et al. | 345/170 |
| 2003/0197692 A1 | * | 10/2003 | Tsuji | 345/179 |
| 2004/0032399 A1 | * | 2/2004 | Sekiguchi et al. | 345/173 |
| 2004/0160421 A1 | * | 8/2004 | Sullivan | 345/173 |
| 2004/0173389 A1 | * | 9/2004 | Sullivan | 178/18.04 |
| 2005/0083313 A1 | * | 4/2005 | Hardie-Bick | 345/177 |
| 2005/0146513 A1 | * | 7/2005 | Hill et al. | 345/173 |
| 2006/0152499 A1 | * | 7/2006 | Roberts | 345/173 |
| 2006/0192763 A1 | * | 8/2006 | Ziemkowski | 345/168 |
| 2007/0070046 A1 | * | 3/2007 | Sheynblat et al. | 345/173 |

FOREIGN PATENT DOCUMENTS

| | | |
|---|---|---|
| JP | 07-319614 | 12/1995 |
| JP | 2001-358817 | 12/2001 |
| JP | 2004-280412 | 10/2004 |
| JP | 2004-287949 | 10/2004 |
| JP | 2009-080745 | 4/2009 |
| KR | 10-2009-0042854 | 4/2009 |

* cited by examiner

*Primary Examiner* — Gene W Lee

(74) *Attorney, Agent, or Firm* — NSIP Law

(57) ABSTRACT

A mobile device and method for processing an acoustic signal are provided. The mobile device may calculate a position of an inputted touch and recognize a character from the calculated position. The mobile device may perform a function corresponding to the recognized character, or display the position of the touch.

19 Claims, 6 Drawing Sheets

FIG. 1 (CONVENTIONAL EXAMPLE)
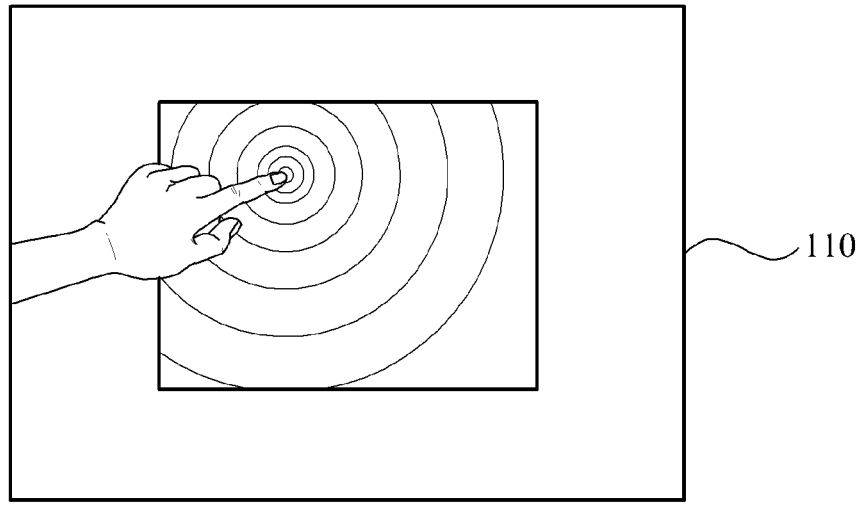
110
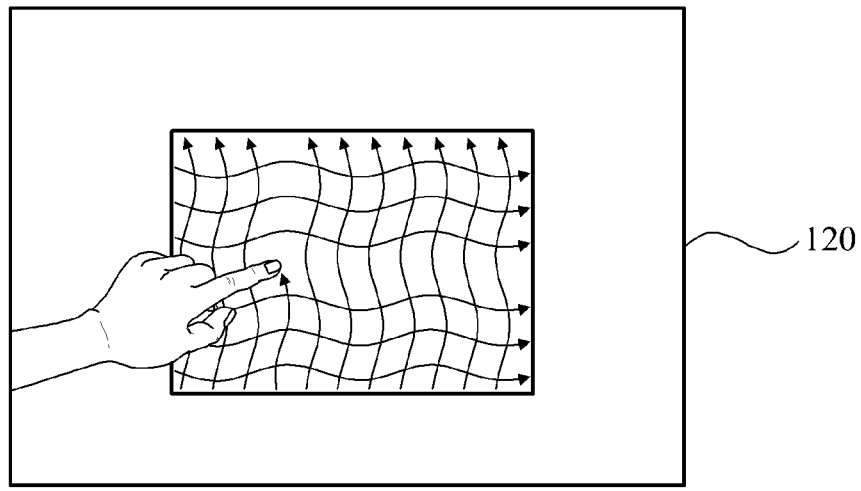
120

MOBILE DEVICE AND METHOD FOR PROCESSING AN ACOUSTIC SIGNAL

CROSS-REFERENCE TO RELATED APPLICATION(S)

This application claims the benefit under 35 U.S.C. §119 (a) of Korean Patent Application No. 10-2009-0095958, filed on Oct. 9, 2009, in the Korean Intellectual Property Office, the entire disclosure of which is incorporated herein by reference for all purposes.

BACKGROUND

1. Field

The following description relates to a technique for processing an acoustic signal in a mobile device.

2. Description of Related Art

Due to a variety of user interface (UI) technologies used in a mobile devices and an improvement in a performance of mobile devices, users may desire to control the mobile device using a more convenient and natural UI. For example, a touch technique in place of an existing key pad may simultaneously provide entertainment and convenience to the users.

However, the touch technique may have several drawbacks. For example, a user needs to directly touch a touch screen of the mobile device to enable the touch to be recognized as an input. Other drawbacks may include, for example, the mobile device being deformed due to being frequently touched, or damage to the touch screen may be caused by a forcible input. Also, the mobile device may need to be miniaturized, and thus, the size of the touch screen may be limited. Also, the user may need to hold/look at the mobile device carefully for an extended period of time to perform an input operation. Thus, the user may become physically stressed or fatigued after using the mobile device for a long period of time.

To address some of the above-mentioned drawbacks, the mobile device may provide a UI of a new scheme to a user using a UI technology employing an acoustic sensor.

FIG. 1 illustrates conventional examples of acoustic-based interfaces.

Referring to FIG. 1, an Acoustic Pulse Recognition (APR) technique 110 may include an acoustic sensor attached to the surface of a device. A unique sound generated by a touch on a specific portion of a surface may be stored. The sound generated when a user touches the specific portion and previously stored sounds may be compared with each other, to determining a position where the touch operation is performed.

However, in the APR technique 110, it may be impossible to recognize a complex touch performed using a character or a figure, and only a position where the touch operation is performed may be determined. Also, when a number of the acoustic sensors is relatively low, the number of touched positions capable of being determined may be small. Also, a range in which the touch operation may be sensed is limited to only a surface of a corresponding device.

Alternatively, a Surface Acoustic Wave (SAW) technique 120 may be performed such that an interrupted position may be calculated. The SAW technique may determine a touch position when an advancing path of a sound wave is interrupted by objects such as fingers, a touch pen, and the like. The SAW technique may include a transmitter for emitting the sound wave to a surface of a corresponding device, a reflector for reflecting the sound wave at predetermined intervals, and a receiver attached on the surface.

However, this SAW technique 120 may also have problems in that the complex touch performed using the character or the figure may be impossible to be recognized, and only a touched position may be determined. Also, a range in which the touch operation may be sensed is limited to only a surface of a corresponding device.

SUMMARY

In one general aspect, there is provided a mobile device for processing an acoustic signal, the device comprising a sensing unit configured to sense an acoustic signal based on a touch inputted from a surface of the mobile device, an acoustic signal processing unit configured to perform signal processing on the sensed acoustic signal, an acoustic signal position determining unit configured to calculate a position of the inputted touch based on the signal-processed acoustic signal, and a character recognition unit configured to recognize a character from the calculated position.

The sensing unit may include at least one of a noise sensor, a vibration sensor, and an ultrasonic sensor.

The acoustic signal processing unit may process the acoustic signal by performing at least one of amplifying and filtering the sensed acoustic signal.

The acoustic signal processing unit may process the acoustic signal by performing at least one of a sampling operation, a quantization operation, and an encoding operation, to convert the sensed analog acoustic signal to a digital acoustic signal.

The acoustic signal position determining unit may calculate the position using a multilateration including a hyperbolic positioning method, based on the time it takes for the acoustic signal to reach the sensing unit.

The acoustic signal position determining unit may divide the signal-processed acoustic signal into segments, and may apply a position calculation algorithm to each of the divided segments to calculate consecutive coordinates with respect to the position of the inputted touch.

The sensing unit may include a plurality of acoustic sensor pairs, and the acoustic signal position determining unit may measure a difference in time from when the acoustic signal reaches each of the plurality of acoustic sensor pairs, and may calculate coordinates of the position using the measured difference in times.

The acoustic signal position determining unit calculates the coordinates of the position inputted by the touch using Equations 1 and 2, $$\sqrt{(x-x_1)^2+(y-y_1)^2}-\sqrt{(x-x_3)^2+(y-y_3)^2}=v\Delta t_{1,3}, \quad \text{[Equation 1]}$$

and $$\sqrt{(x-x_2)^2+(y-y_2)^2}-\sqrt{(x-x_4)^2+(y-y_4)^2}=v\Delta t_{2,4}, \quad \text{[Equation 2]}$$

where x and y denote coordinates of the position of the inputted touch, and $(x_1,y_1)$, $(x_2,y_2)$, $(x_3,y_3)$, and $(x_4,y_4)$ denote coordinates of the locations of the plurality of acoustic sensor pairs.

The character recognition unit may recognize a character based on an input of consecutive coordinates of the calculated position.

The mobile device may further comprise a user configuration unit to receive, from a user, a designation for a function to be performed in association with the recognized character, and a function execution unit to perform a function corresponding to the recognized character.

In another general aspect, there is provided a mobile device for processing an acoustic signal, the mobile device comprising a sensing unit configured to sense an acoustic signal based on a touch event with respect to an object that is approximately in contact with the mobile device, an acoustic signal processing unit configured to perform signal processing on the sensed acoustic signal, an acoustic signal position determining unit configured to calculate a position generated by the touch event using the signal-processed acoustic signal, and a shape recognition unit configured to recognize the calculated position as a shape.

The mobile device may further comprise a vibration unit to generate a vibration signal based on the sensed acoustic signal, wherein the acoustic signal processing unit may measure an acoustic propagation speed including a speed in which the acoustic signal is propagated from the object, based on the distance between the sensing unit and the vibration unit and the time it takes for the vibration signal to be sensed by the sensing unit.

The acoustic signal position determining unit may calculate the position using a multilateration including a position calculation algorithm, based on a time delay from when the acoustic signal reaches the sensing unit and the measured acoustic propagation speed.

The mobile device may further comprise a display unit to display the recognized shape in a symmetrical manner.

In another general aspect, there is provided a method of processing an acoustic signal, the method comprising sensing an acoustic signal based on a touch inputted from a surface of a mobile device, signal processing the sensed acoustic signal, calculating a position of the inputted touch based on the signal-processed acoustic signal, and executing a function based on the calculated position.

The sensing may include sensing the acoustic signal generated by touching an object that is approximately in contact with the mobile device.

The signal processing may include at least one of amplifying and filtering the sensed acoustic signal, and the signal processing may include at least one of a sampling operation, a quantization operation, and an encoding operation to convert the sensed analog acoustic signal into a digital acoustic signal.

The calculating may include dividing the signal-processed acoustic signal into segments, and calculating consecutive coordinates of the position of the inputted touch by applying a position calculation algorithm to each of the divided segments.

The calculating may include calculating the position using a multilateration including a position calculation algorithm, based on the time it takes for the acoustic signal to reach an acoustic sensor that includes at least one of a noise sensor, a vibration sensor, and an ultrasonic sensor.

The calculating may include measuring a difference in time from when the acoustic signal reaches each of a plurality of acoustic sensor pairs for sensing the acoustic signal, and calculating coordinates of the position by applying the measured difference in times to Equations 1 and 2, $$\sqrt{(x-x_1)^2+(y-y_1)^2}-\sqrt{(x-x_3)^2+(y-y_3)^2}=v\Delta t_{1,3}, \quad \text{[Equation 1]}$$

and $$\sqrt{(x-x_2)^2+(y-y_2)^2}-\sqrt{(x-x_4)^2+(y-y_4)^2}=v\Delta t_{2,4}, \quad \text{[Equation 2]}$$

where x and y denote coordinates of the position of the inputted touch, and $(x_1,y_1)$, $(x_2,y_2)$, $(x_3,y_3)$, and $(x_4,y_4)$ denote coordinates of the position of the plurality of acoustic sensor pairs.

The method may further comprise storing, in a storing unit, a character corresponding to the function to be performed, wherein the executing includes recognizing, as a character, a consecutive input with respect to coordinates of the calculated position, and executing the function based on the recognized character stored in the storing unit.

The method may further comprise recognizing the calculated position as a continuous shape, and displaying, on a screen, the recognized shape.

In another general aspect, there is provided a computer-readable storage medium storing a program to process an acoustic signal, the storage medium comprising sensing an acoustic signal based on a touch inputted from a surface of a mobile device, signal processing the sensed acoustic signal, calculating a position inputted by the touch based on the signal-processed acoustic signal, and executing a function based on the calculated position.

Other features and aspects may be apparent from the following description, the drawings, and the claims.

BRIEF DESCRIPTION OF THE DRAWINGS

FIG. 1 is a diagram illustrating conventional examples of an acoustic-based interface.

Throughout the drawings and the description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 2:
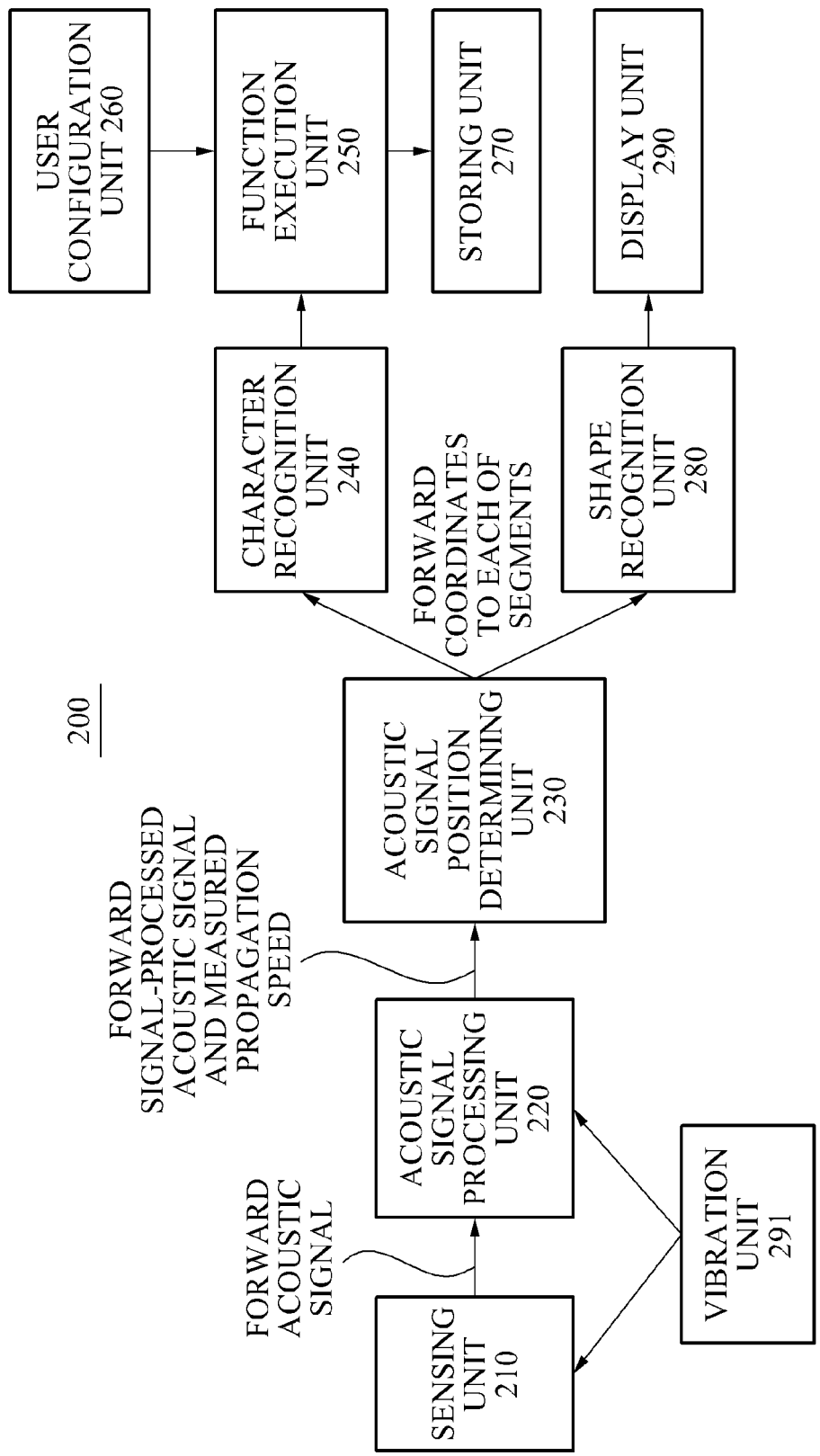
FIG. 2 is a diagram illustrating an example of a mobile device that performs acoustic signal processing.

FIG. 2 illustrates an example of a mobile device (also referred to as a mobile terminal) that performs acoustic signal processing.

Referring to FIG. 2, the mobile device 200 may include a sensing unit 210, an acoustic signal processing unit 220, an acoustic signal position determining unit 230, a character recognition unit 240, a function execution unit 250, a user configuration unit 260, a storing unit 270, a shape recognition unit 280, a display unit 290, and a vibration unit 291.

The sensing unit 210 may sense, as an acoustic signal, a touch inputted from a surface of the mobile device 200. The surface may be, for example, a front surface, a rear surface, a side surface, and the like. The sensing unit 210 may include, for example, at least one of a noise sensor, a vibration sensor, an ultrasonic sensor, and the like, which are used for sensing acoustic signals. Each of the noise sensor, the vibration sensor, and the ultrasonic sensor may be an acoustic sensor for sensing the acoustic signal, and may also have a different method of sensing the acoustic signal.

The sensing unit 210 may be attached on a surface of the mobile device 200, sense an analog signal generated from an interior or an exterior of the mobile device 200, and transmit the sensed acoustic signal to the acoustic signal processing unit 220. The mobile device may include one or more acoustic sensors, for example, one sensor, two sensors, four sensors, six sensors, 10 sensors, or other desired amount of sensors. In the example shown in FIG. 2, the mobile device 200 includes four acoustics sensors, acting as the sensing unit 210, mounted on each of edges of the mobile device 200. This example is merely for illustration. The number of sensors, they type of sensors, and the location of the sensors may be any desired number, type, and location.

The acoustic signal processing unit 220 may perform signal processing on the sensed acoustic signal. The acoustic signal processing unit 220 may amplify the sensed acoustic signal, for example, when the sensed acoustic signal is relatively weak. The acoustic signal processing unit 220 may reduce noise from the acoustic signal. The acoustic signal processing unit 220 may perform a filtering of the acoustic signal for one or more frequency bands. The acoustic processing unit 220 may perform, for example, at least one of a sampling operation, a quantization operation, and an encoding operation to convert the analog acoustic signal into a digital acoustic signal, and the like.

The acoustic signal position determining unit 230 may calculate a position of an inputted touch using a multilateration also known as a hyperbolic positioning method. The multilateration may include a position calculation algorithm that is based on a time delay of when the acoustic signal reaches the sensing unit 210. For example, the acoustic signal position determining unit 230 may divide the signal-processed acoustic signal into segments, and apply the position calculation algorithm to each of the segments to obtain consecutive coordinates with respect to the position of the inputted touch. For example, the consecutive coordinates may include a consecutive line such as an "O", an "L", a "V", an "X", and the like.

According to various embodiments, when the sensing unit 210 includes a plurality of acoustic sensor pairs, the acoustic signal position determining unit 230 may measure a difference in time from when the acoustic signal reaches each of the plurality of acoustic sensor pairs. The signal position determining unit 230 may calculate the coordinates of the position using the measured difference in times.

The character recognition unit 240 may recognize a character from the calculated position. For example, the character recognition unit 240 may recognize, as a character, a consecutive input with respect to the calculated coordinates of the position.

The function execution unit 250 may perform a function based on the recognized character. The user may previously set the function to be performed based on the character. In this regard, the user configuration unit 260 may receive, from a user, a designation for the function to be performed based on the character. For example, the character "X" may correspond to a power off function, the character "P" may correspond to a play video function, and the like. The storing unit 270 may store a character associated with the function. In this manner, the function execution unit 250 may perform the function based on the character stored in the storing unit 270.

In the example shown in FIG. 2, the sensing unit 210, the acoustic signal processing unit 220, the acoustic signal position determining unit 230, the character recognition unit 240, the function execution unit 250, the user configuration unit 260, the storing unit 270, the shape recognition unit 280, the display unit 290, and the vibration unit 291 are described as separate components. However, it should be understood that one or more of the components may be combined into the same component.

Figure 3:
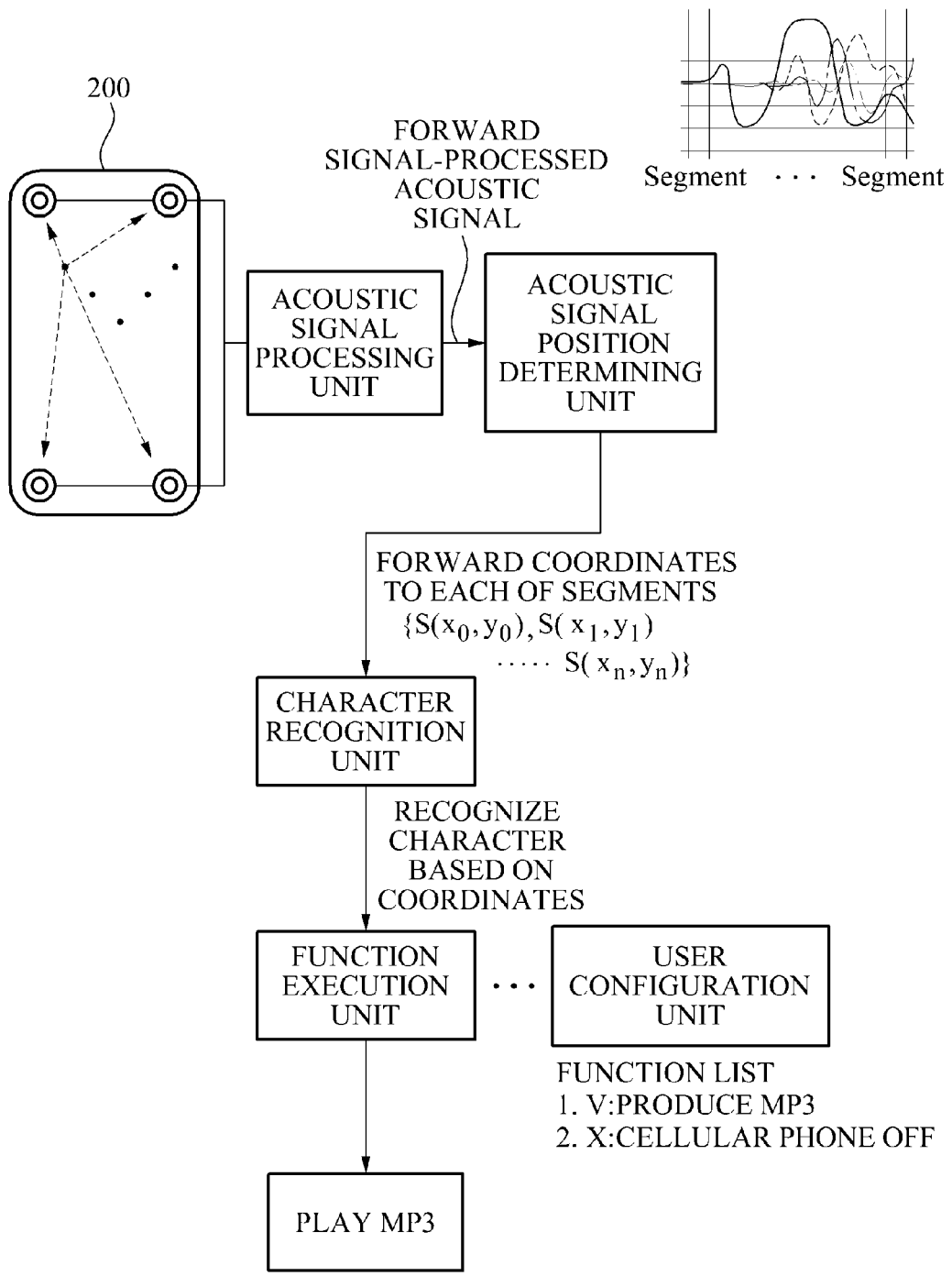
FIG. 3 is a diagram illustrating an example of sensing an acoustic signal based on a touch inputted on a surface of the example mobile device of FIG. 2.

FIG. 3 illustrates an example of sensing an acoustic signal based on a touch inputted from a surface of the example mobile device of FIG. 2.

Referring to FIG. 3, the mobile device 200 may include one or more sensors. In this example, the mobile device 200 includes four acoustic sensors acting as the sensing unit 210 and located approximate edges of the mobile device 200. The four acoustic sensors may have coordinates, for example, $(x_1,y_1)$, $(x_2,y_2)$, $(x_3,y_3)$, and $(x_4,y_4)$, respectively, and the coordinates of the position of the inputted touch may be (x,y). The acoustic signal position determining unit 230 may calculate the position using the multilateration also known as hyperbolic positioning method based on a difference in time from when the acoustic signal reaches one or more of the acoustic sensors.

For example, when a touch shaped like the character "V" is recognized by the character recognition unit 240, the function execution unit 250 may play a Moving Picture Experts Group layer 3 (MP3) file based on the recognized character "V". As another example, when a touch shaped like a character "X" is recognized from the calculated position, the function execution unit 250 may turn off a power of the mobile device 200 based on the recognized character "X".

Figure 4:
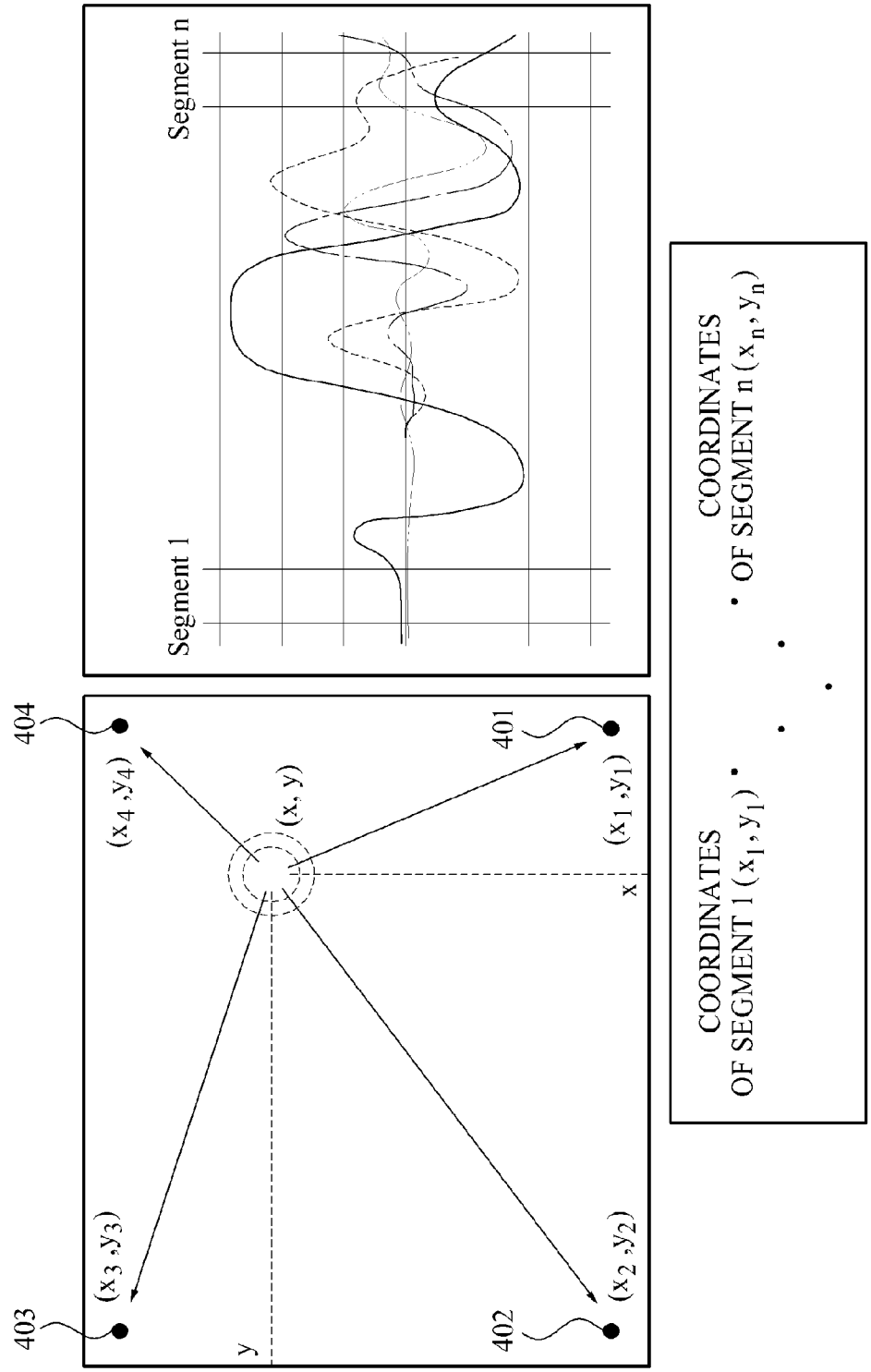
FIG. 4 is a diagram illustrating an example of calculating a position of an inputted touch using the example mobile device of FIG. 2.

FIG. 4 illustrates an example of calculating a position of an inputted touch using the example mobile device of FIG. 2.

Referring to FIG. 4, the acoustic signal position determining unit 230 may calculate coordinates of the position of the inputted touch using the following example Equations 1 and 2.

$$\sqrt{(x-x_1)^2+(y-y_1)^2}-\sqrt{(x-x_3)^2+(y-y_3)^2}=v\Delta t_{2,4}, \qquad \text{[Equation 1]}$$

and $$\sqrt{(x-x_2)^2+(y-y_2)^2}-\sqrt{(x-x_4)^2+(y-y_4)^2}=v\Delta t_{2,4}, \qquad \text{[Equation 2]}$$

where $(x_1,y_1)$, $(x_2,y_2)$, $(x_3,y_3)$, and $(x_4,y_4)$ denote coordinates of four acoustic sensors (401, 402, 403, and 404) included in the mobile device 200, (x, y) denotes coordinates of the position of the inputted touch, and "v" denotes a speed in which a sound wave is propagated in the surface of the mobile device 200.

The acoustic signal position determining unit 230 may measure a difference in time ($v\Delta t_{1,3}$) from when the acoustic signal reaches the acoustic sensors 401 and 403 from the position of the inputted touch using Equation 1, and measure another difference in time ($v\Delta t_{2,4}$) from when the acoustic signal reaches the acoustic sensors 402 and 404 from the position of the inputted touch using Equation 2. The acoustic signal position determining unit 230 may calculate the coordinates of the position using the measured difference in times.

According to various embodiments, the acoustic signal position determining unit 230 may divide the acoustic signal into segments, for example, segment 1, segment 2 . . . , and segment n, and apply multilateration to each of the divided segments. The multilateration may be based on a difference in time from when the acoustic signal reaches each of the acoustic sensors to obtain consecutive coordinates with respect to the position of the inputted touch. For example, the acoustic signal position determining unit 230 may obtain coordinates $(x_1,y_1)$ of a segment 1, coordinates $(x_2,y_2)$ of a segment 2, . . . and coordinates $(x_n,y_n)$ of a segment n, respectively, to calculate the consecutive coordinates with respect to the position of the inputted touch.

Figure 5:
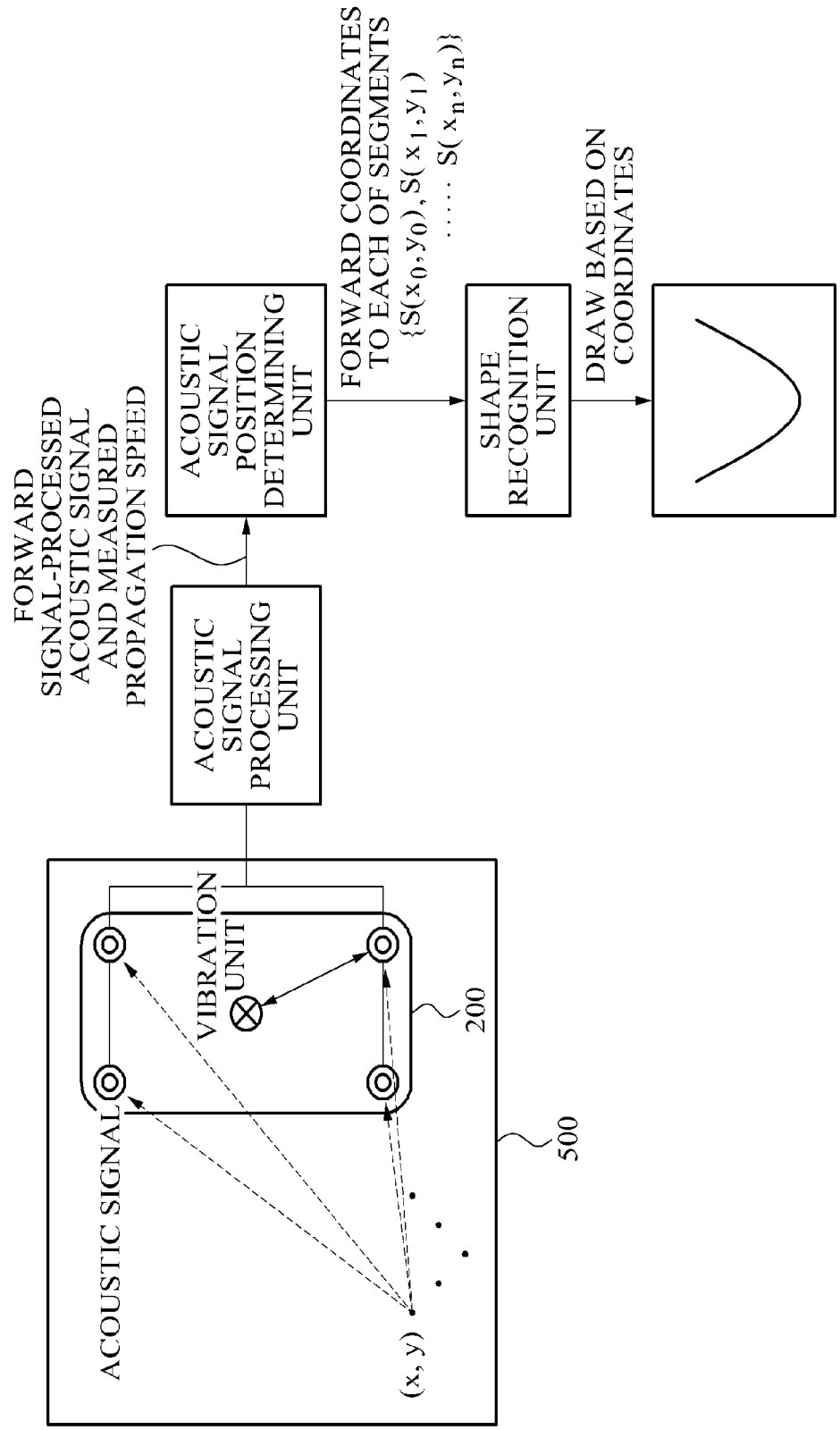
FIG. 5 is a diagram illustrating an example of sensing an acoustic signal based on a touch event generated by an object being near the example mobile device of FIG. 2.

FIG. 5 illustrates an example of sensing an acoustic signal based on a touch event of an object located near the example mobile device of FIG. 2.

Referring to FIG. 5, the sensing unit 210 may sense an acoustic signal in accordance with the touch event generated with respect to the object 500. That is, the sensing unit 210 may sense, as the acoustic signal, a touch event that occurs on the object 500 that is approximately in contact with the mobile device 200. For example, the object may be made of different materials such as a wood desk, a book, a wire plate, and the like. For example, a user may touch the object 500 of a desk in a state in which the mobile device 200 is nearby the desk. The sensing unit 210 may sense, the operation of touching the desk by the user.

When the acoustic signal is sensed, the vibration unit 291 may generate a vibration signal. The vibration unit 291 may be disposed in the mobile device 220, for example, approximate a center portion of the mobile device 200.

In this regard, the acoustic signal processing unit 220 may measure a speed in which the acoustic signal is propagated via the object 500, based on a distance between the sensing unit 210 and the vibration unit 291, and a time it takes for the vibration signal to be sensed by the sensing unit 210. The speed in which the acoustic signal is propagated is the acoustic propagation speed.

For example, the acoustic propagation speed may be propagated via a solid element and may vary depending on size, consistency, material, and shape of the object 500. Accordingly, when the acoustic signal is generated by a user using the object that is different from the mobile device 200, a current speed by the object 500 of propagating the acoustic signal may be measured. In this example, the object 500 may be approximately in contact with the mobile device 200. As describe herein, the phrase "approximately in contact" includes the mobile device in contact with the object, or the mobile device not in contact with the object, but close enough to sense a touch input. However, as illustrated in FIG. 3, the acoustic signal may be generated via a surface of the mobile device 200, or the object may be fixed on the mobile device 200 as an external material of the mobile device 200. In these examples, the acoustic signal position determining unit 230 may use a previously stored acoustic propagation speed.

That is, because the acoustic signal processing unit 220 obtains a distance (D) between the sensing unit 210 and the vibration unit 291 and a time (T) it takes for the vibration signal to be sensed by the sensing unit 210, a speed (V) in which the acoustic signal is propagated via the object 500 may be measured (i.e. distance (D)=speed (V)×time (T)).

In this regard, the acoustic signal position determining unit 230 may calculate a position where the touch event is generated using a multilateration. The multilateration is a position calculation algorithm based on a time delay for the acoustic signal to reach the sensing unit 210 and the measured acoustic propagation speed.

The shape recognition unit 280 may recognize the calculated position as a shape. For example, a shape such as a picture or an image may include a line having consecutive coordinates, and the shape recognition unit 280 may recognize, as the shape, the calculated position having the consecutive coordinates. The shape may also include broken lines or non-consecutive coordinates.

The display unit 290 may display the recognized position as the shape in a symmetrical manner. For example, as illustrated in FIG. 5, the display unit 290 may display a recognized shape "V" on the screen.

Figure 6:
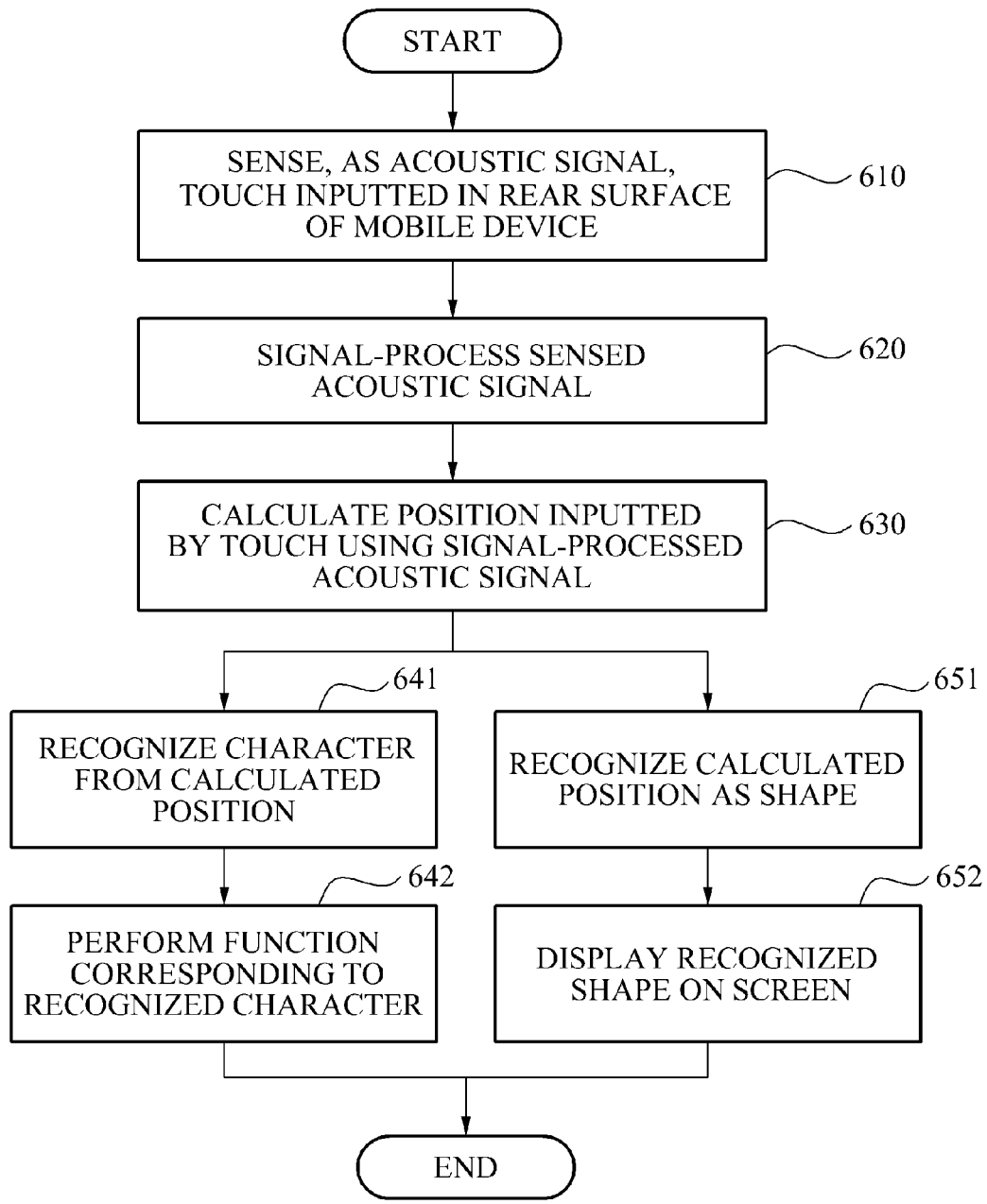
FIG. 6 is a flowchart illustrating a method for processing an acoustic signal.

FIG. 6 illustrates an example method for processing an acoustic signal.

In operation 610, the method senses an acoustic signal, for example, a touch inputted from a surface of a mobile device. For example, the mobile device may include one or more acoustic sensors attached on or inside the mobile device, and may sense an acoustic signal generated in an interior or an exterior of the mobile device. The mobile device may also sense an acoustic signal with respect to a touch event generated via an object being approximately in contact with the mobile device.

In operation 620, the method performs signal processing on the sensed acoustic signal. For example, the method may perform at least one of amplifying the sensed acoustic signal, eliminating a noise from the acoustic signal, converting the acoustic signal from an analog acoustic signal into a digital acoustic signal, and the like.

In operation 630, the method calculates a position of the inputted touch based on the signal-processed acoustic signal. For example, the method may calculate the position using a multilateration. The multilateration is a position calculation algorithm, based on the time it takes for the acoustic signal to reach a sensor, for example, a noise sensor, a vibration sensor, an ultrasonic sensor, and the like.

Next, the method may perform either operation 641 or operation 651.

In operation 641, the method may recognize a character based on an input with respect to coordinates of the calculated position. In operation 642, the method may perform a function associated with the recognized input as the character. For example, the method may receive in advance, from a user, a function to be performed corresponding to the character. The function corresponding to the character may be stored in the storing unit 270, and the method may perform the function stored in the storing unit 270. For example, a V-shaped input performed by a user may cause the mobile device to play an MP3.

In operation 651, the method may recognize, as a shape, the calculated position. In operation 652, the method may display, on a screen, the recognized position as the shape in a symmetrical manner.

The method illustrated in FIG. 6 may adopt descriptions of the operations illustrated in FIGS. 2 to 5, and thus detailed descriptions thereof are omitted.

The mobile device and method described herein may recognize a touch of a user on the mobile device, or a touch of the user on an object approximately in contact with the mobile device. The inputted touch may be sensed by one or more acoustic sensors contained in the mobile device. The mobile device may include a storage that has stored therein a number of functions, for example, play MP3, make a phone call, check e-mail, power off, power on, and the like. The functions may be preset, for example, by a user of the mobile device, by the manufacturer of the mobile device, and the like.

The mobile device may include a character recognition unit that recognizes the inputted touch of a user on a surface of the mobile device, or on an object approximately in contact with the mobile device. The mobile device may search the storage and determine a character that corresponds to the touch inputted by the user. Based on the inputted touch, the mobile device may perform the function that corresponds to the character inputted by the user. Also, the mobile device may display the character corresponding to the inputted touch on a display.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal device described herein may refer to mobile devices such as a cellular phone, a personal digital assistant (PDA), a digital camera, a portable game console, and an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile device for processing an acoustic signal, the device comprising:
    a sensing unit configured to sense an acoustic signal based on a touch inputted on a surface of the mobile device;
    an acoustic signal processing unit configured to perform signal processing on the sensed acoustic signal and determine an actual propagation speed of the sensed acoustic signal using a vibration unit;
    an acoustic signal position determining unit configured to divide the signal-processed acoustic signal into segments of the signal corresponding to different periods of time, and apply a multilateration comprising a hyperbolic positioning method to each of the divided segments to calculate consecutive coordinates with respect to the position of the inputted touch; and
    a character recognition unit configured to recognize a character from the consecutive coordinates.

2. The mobile device of claim 1, wherein the sensing unit comprises at least one of: a noise sensor, a vibration sensor, and an ultrasonic sensor.

3. The mobile device of claim 1, wherein the acoustic signal processing unit is further configured to process the acoustic signal by performing at least one of: amplifying and filtering the sensed acoustic signal.

4. The mobile device of claim 1, wherein the acoustic signal processing unit is further configured to process the acoustic signal to convert the sensed analog acoustic signal to a digital acoustic signal by performing at least one of: a sampling operation, a quantization operation, and an encoding operation.

5. The mobile device of claim 1, wherein the character recognition unit is further configured to recognize a character based on an input of consecutive coordinates of the calculated position.

6. The mobile device of claim 1, further comprising:
    a user configuration unit configured to receive, from a user, a designation for a function to be performed in association with the recognized character; and
    a function execution unit configured to perform a function corresponding to the recognized character.

7. The mobile device of claim 1, wherein:
    the sensing unit comprises a plurality of acoustic sensor pairs; and
    the acoustic signal position determining unit is further configured to:
    measure a difference in time from when the acoustic signal reaches each of the plurality of acoustic sensor pairs; and
    calculate coordinates of the position using the measured difference in times.

8. The mobile device of claim 7, wherein the acoustic signal position determining unit is further configured to calculate the coordinates of the position inputted by the touch using Equations 1 and 2, $$\sqrt{(X-X_1)^2+(y-y_1)^2}-\sqrt{(x-x_3)^2+(y-y_3)^2}=v\Delta t_{1,3} \quad \text{[Equation 1]}$$

and $$\sqrt{(X-X_2)^2+(y-Y_2)^2}-\sqrt{(X-X_4)^2+(y-y_4)^2}=v\Delta t_{2,4} \quad \text{[Equation 2]}$$

where x and y denote coordinates of the position of the inputted touch, and $(x_1,y_1)$, $(x_2,y_2)$, $(x_3,y_3)$, and $(x_4,y_4)$ denote coordinates of the locations of the plurality of acoustic sensor pairs.

9. A mobile device for processing an acoustic signal, the mobile device comprising:

a sensing unit configured to sense an acoustic signal based on a touch event with respect to an object that is approximately in contact with the mobile device;

an acoustic signal processing unit configured to perform signal processing on the sensed acoustic signal and determine an actual propagation speed of the sensed acoustic signal using a vibration unit;

an acoustic signal position determining unit configured to divide the signal-processed acoustic signal into segments of the signal corresponding to different periods of time, and apply a multilateration comprising a hyperbolic positioning method to each of the divided segments to calculate consecutive coordinates with respect to the position of the inputted touch; and a shape recognition unit configured to recognize the consecutive coordinates as a shape.

10. The mobile device of claim 9, further comprising:
the vibration unit is configured to generate a vibration signal based on the sensed acoustic signal,
wherein the acoustic signal processing unit is further configured to measure the actual propagation speed of the sensed acoustic signal based on the distance between the sensing unit and the vibration unit and the time it takes for the vibration signal to be sensed by the sensing unit.

11. The mobile device of claim 9, further comprising a display unit configured to display the recognized shape in a symmetrical manner.

12. A method of processing an acoustic signal, the method comprising:
sensing an acoustic signal based on a touch inputted on a surface of a mobile device or an object that is approximately in contact with the mobile device;
signal processing the sensed acoustic signal;
determining an actual propagation speed of the sensed acoustic signal using a vibration unit;
dividing the signal-processed acoustic signal into segments of the signal corresponding to different periods of time;
calculating consecutive coordinates of the position of the inputted touch by applying a multilateration comprising a hyperbolic positioning method to each of the divided segments; and
executing a function based on the consecutive coordinates.

13. The method of claim 12, wherein the sensing comprises sensing the acoustic signal based on the touch inputted on the object that is approximately in contact with the mobile device.

14. The method of claim 12, wherein:
the signal processing comprises at least one of: amplifying and filtering the sensed acoustic signal; and
the signal processing comprises at least one of: a sampling operation, a quantization operation, and an encoding operation to convert the sensed analog acoustic signal into a digital acoustic signal.

15. The method of claim 12, wherein the calculating comprises calculating the position using a multilateration comprising a position calculation algorithm, based on the time it takes for the acoustic signal to reach an acoustic sensor that includes at least one of: a noise sensor, a vibration sensor, and an ultrasonic sensor.

16. The method of claim 12, wherein the calculating comprises:
measuring a difference in time from when the acoustic signal reaches each of a plurality of acoustic sensor pairs for sensing the acoustic signal; and
calculating coordinates of the position by applying the measured difference in times to Equations 1 and 2, $$\sqrt{(x-x_1)^2+(y-y_1)^2}-\sqrt{(x-x_3)^2+(y-y_3)^2}=v\Delta t_{1,3} \quad \text{[Equation 1]}$$

and $$\sqrt{(x-x_2)^2+(y-Y_2)^2}-\sqrt{(X-X_4)^2+(y-y_4)^2}=v\Delta t_{2,4} \quad \text{[Equation 2]}$$

where x and y denote coordinates of the position of the inputted touch, and $(x_1,y_1)$, $(x_2,y_2)$, $(x_3,y_3)$, and $(x_4,y_4)$ denote coordinates of the position of the plurality of acoustic sensor pairs.

17. The method of claim 12, further comprising:
storing, in a storing unit, a character corresponding to the function to be performed,
wherein the executing comprises:
recognizing, as a character, a consecutive input with respect to coordinates of the calculated position; and
executing the function based on the recognized character stored in the storing unit.

18. The method of claim 12, further comprising:
recognizing the calculated position as a continuous shape; and
displaying, on a screen, the recognized shape.

19. A non-transitory computer-readable storage medium storing a program for controlling a computer to execute a method, the method comprising:
sensing an acoustic signal based on a touch inputted on a surface of a mobile device or an object that is approximately in contact with the mobile device;
signal processing the sensed acoustic signal;
determining an actual propagation speed of the sensed acoustic signal using a vibration unit;
dividing the signal-processed acoustic signal into segments of the signal corresponding to different periods of time;
calculating consecutive coordinates of the position of the inputted touch by applying a multilateration comprising a hyperbolic positioning method to each of the divided segments; and
executing a function based on the consecutive coordinates.

* * * * *